Figure 1:
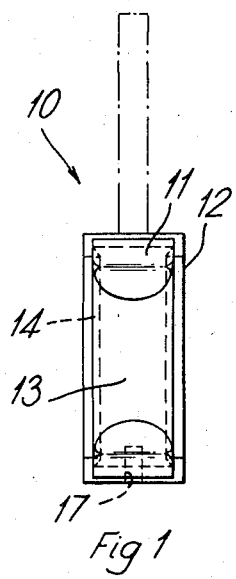

United States Patent [19]
Dee

[11] 3,852,831
[45] Dec. 10, 1974

[54] ENDOPROSTHETIC ELBOW JOINT
[75] Inventor: Roger Dee, Norfolk Nor, England
[73] Assignee: National Research Development Corporation, London, England
[22] Filed: Jan. 29, 1974
[21] Appl. No.: 437,663

[30] Foreign Application Priority Data
Jan. 31, 1973 Great Britain .................. 4837/73

[52] U.S. Cl. .................................... 3/1, 128/92 C
[51] Int. Cl. .............................................. A61f 1/24
[58] Field of Search ..... 3/1; 128/92 C, 92 CA, 92 R

[56] References Cited
UNITED STATES PATENTS
| | | | |
|---|---|---|---|
| 3,521,302 | 7/1970 | Muller | 3/1 |
| 3,656,186 | 4/1972 | Dee | 3/1 |
| 3,688,316 | 9/1972 | Lagrange et al. | 3/1 |
| 3,728,742 | 4/1973 | Averill et al. | 3/1 |

FOREIGN PATENTS OR APPLICATIONS
| | | | |
|---|---|---|---|
| 1,047,640 | 7/1953 | France | 128/92 C |
| 1,902,700 | 8/1970 | Germany | 3/1 |

Primary Examiner—Richard A. Gaudet
Assistant Examiner—Ronald L. Frinks
Attorney, Agent, or Firm—Cushman, Darby & Cushman

[57] ABSTRACT

An endoprosthetic elbow joint has an ulnar component with a saddle shaped bearing surface and a humeral component including a bifurcated member supporting a bearing member between the free ends of its arms. The humeral bearing member has a bearing surface which is of generally complementary shaping to that of the ulnar component to engage in and across the saddle shaping of the latter for mutual articulation. In a preferred arrangement the ulnar component includes a platform with which a bearing member is releasably connected, suitably by a sliding dovetail-section keying, the connecting interfaces are circularly curved, and the bearing member can pass through the humeral component. With this arrangement the humeral component and ulnar platform are fixed in place and the ulnar bearing member is then passed through the humeral component in bearing engagement therewith to connect with the platform.

10 Claims, 5 Drawing Figures

PATENTED DEC 10 1974　　3,852,831

ENDOPROSTHETIC ELBOW JOINT

This invention concerns prosthetic devices and relates more particularly to endoprosthetic elbow joint devices.

The currently conventional form of these devices involves two hinge parts which are directly mechanically linked by a pivot pin, and the hinge parts are provided with intramedullary stems projecting therefrom for respective securement in the humerus and ulna. However, while such devices are generally satisfactory, difficulty can arise in that forces are transmitted through the hinge which tend to weaken the securement of the stems.

An object of the present invention is to provide an improved endoprosthetic elbow joint device which does not involve the use of a direct mechanically linked hinge and so reduces the above mentioned difficulty.

In a more general aspect, the present invention provides such a device comprising a cooperable pair of ulnar and humeral components; the ulnar component including a first bearing member having a first bearing surface of generally saddle shaping formed as part of a surface of revolution with concave circumferential form and convex axial form; and the humeral component including a bifurcated member, and a second bearing member bridging the free ends of the arms of said bifurcated member, said second bearing member having a second bearing surface shaped, for mutual articulating generally complementary bearing engagement with said first bearing surface, as a surface of revolution with its axis of revolution extending between said arm free ends, with convex circumferential form of greater angular extent than that of said first bearing surface, and with concave axial form.

During initial development of the invention the components were formed to be secured in their respective bones by the use of intramedullary stems and acrylic cement or equivalent gap-filling medium. For this purpose the first or ulnar bearing member was suitably provided by way of a platform structure having one major face profiled to provide the saddle shaped bearing surface, while an intramedullary stem was provided to project from the opposite major face of the structure to extend therefrom in a generally diametral direction relative to the relevant axis of revolution. Similarly, the second or humeral component was suitably provided with an intramedullary stem as an extension from the junction of the bifurcated arms, the stem projecting remotely from the associated bearing member to provide a generally Y-shape for the bifurcated member.

However, a subsequent and presently preferred development of the invention has dispensed with such stems in order to facilitate implantation of the device. In this case the components may have appropriate surface areas formed with low relief configurations, such as by the provision of ribs, studs, or grooves, in order to afford an enhanced key for purposes of securement with cement. It is, in any case, preferred that the ulnar component in this later development of the invention be of such a form and dimensions to permit passage of at least the bearing member thereof through the aperture defined by the bifurcated arms and bearing member of the humeral component.

The components of the proposed device can each be of integral metal construction, but it is presently preferred that one bearing member be of metal and the other of plastics material to take advantage of the better frictional properties which are possible with such a combination of materials. For this purpose, the ulnar bearing member can be provided in two-part form including a bearing part of plastics material releasably connected with a metal platform part therebelow. Such a two-part construction is particularly suitable for facilitating passage through the aperture of the humeral component bearing member.

Figure 2:
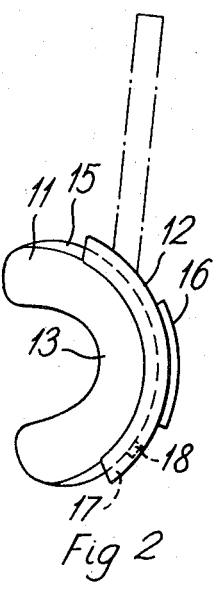
Figure 3:
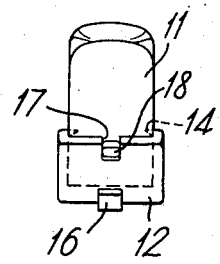
Figure 4:
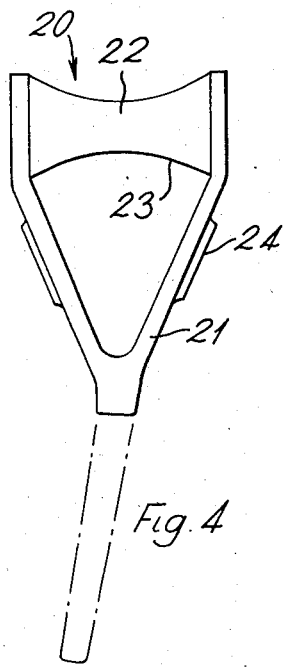
Figure 5:
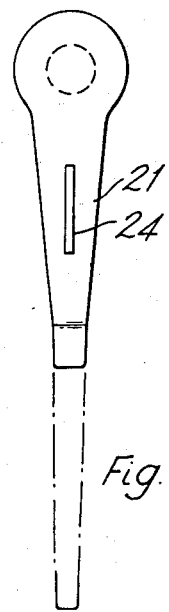

For a clearer understanding of the above and other features of the invention, one embodiment of the invention will now be described, by way of example, with reference to the accompanying drawings, in which:

FIGS. 1, 2 and 3 are mutually orthogonal, schematic side elevations and a schematic end elevation of the ulnar component of the embodiment in question, and FIGS. 4 and 5 similarly illustrate corresponding side elevations of the associated humeral component.

The illustrated ulnar component is denoted generally at 10 and comprises a bearing member 11 of plastics material connected with a platform member 12 of metal. The bearing member 11 is effectively formed from a solid block of which one major surface is relieved to provide a saddle-shaped bearing surface 13 as part of a surface of revolution. The latter surface is formed with a convex generator and negative radius of curvature to provide convex axial form and concave circumferential form. The bearing surface is, as already noted, only part of the associated surface of revolution and will normally have a circumferential angular extent which is about 180° in its axially central region but reducing towards its axial extremities. This feature of shaping arises from the provision of an upward taper to the notional relieved block as seen in the end elevation of FIG. 3. There is also a similar tapering for the bearing member as seen in the side elevation of FIG. 2.

The bearing member 11 can be connected with its platform member 12 in any suitable manner, but the presently preferred mode of connection is illustrated by FIG. 3. In this instance the platform member 12 is formed with a dovetail-section key-way 14 to receive a complementary key 15 extending from the underside of the bearing member. It is, in any case, to be noted that interfaces of the platform and bearing members are defined by a surface of revolution formed about an axis parallel to, and preferably coincident with, that of the bearing surface 13. Indeed, both members have an overall curved form.

Anyway, it will be appreciated that the platform member 12 can be located in position first relative to the ulnar, and the bearing member connected thereto subsequently. For purposes of fixation the under surface of the platform member is preferably provided with a low relief configuration, shown in the form of a rib 16 extending parallel to the keyway 14, to key with cement. Fixation of the bearing member to the platform member is effected by the provision of a slot 17 in one end of the platform, which slot extends parallel to the keyway and receives a stud 18 projecting from the under surface of the bearing member. Cement enters this slot to surround the stud. In addition, or as an alternative, the platform can be apertured to provide access to bores or recesses in the underface of the bearing member whereby cement intrudes through the platform into the bearing member.

The illustrated humeral component is denoted generally at 20 and comprises an integral metal structure of a securement and bearing support member 21 having generally Y-shape, and a bearing member 22 bridging the free ends of the Y-arms. In the initial terminology used hereinbefore in describing the invention, the Y-arms constitute a bifurcated member from the junction of the arms of which the Y-stem projects as a short intramedullary stem or stud, while the bearing member bridges the free ends of the arms.

The bearing member 22 has a bearing surface 23 in the form of a surface of revolution defined with reference to an axis extending between the free ends of the Y-arms. This bearing surface is generally complementary to that of the ulnar component and so has a concave axial form and a convex circumferential form, the latter being of greater angular extent than in the ulnar component. However, the bearing surfaces are not necessarily precisely complementary, but preferably differ by provision of an ulnar bearing surface circumferential curvature which is less than the humeral surface axial curvature. In use of the device the components are held with their bearings surfaces in mutually articulatory engagement by the natural joint capsule. Given such engagement, the components are relatively dimensioned so that the upstanding ends of the saddle shaping of the ulnar bearing surface can enter the aperture in the humeral component between the Y-arms of the latter. This enhances the range of articulation which would otherwise be possible, and the circumferential extent of the humeral bearing surface 23 should exceed that of the ulnar bearing surface 14 by at least this range. The latter extent has been quoted as having a maximum value of about 180°, an approach towards this value being desirable to enhance the bearing engagement, and an increase to just above this value may be preferred when a plastics material is used to allow a snap-fit to be effected between the bearing members.

Regarding the Y-shaped member 21: the Y-arms converge towards their junction in a continuously progressive manner over substantially the whole of their lengths to complement the tapered form of the ulnar bearing member as seen in end elevation (FIG. 3). This is beneficial in affording a marked reduction in overall width for the humeral component between its bearing member and stem, and this is of practical relevance in reducing the amount of bone removal which may otherwise be necessary in the humerus to receive the component. The necessary exposure of the aperture in the humeral component can in fact be obtained by enlargement of the groove between the trochlea and capitellum of the humerus, while allowing penetration of the Y-arms into the bone. This allows securement of the outer side surfaces of the Y-arms by the provision of grooves therein, and/or studs or ribs as shown at 24 thereon, to key with cement and so enhance the securement by way of the stem. Also, this seating of the Y-arms within the humerus further reduces the necessary amount of bone removal in that there need be no significant reduction of the length of the humerus, and the head of the radius can be retained.

The associated fixation of the ulnar component has already been indicated above insofar as the platform member is located first and the bearing member connected with thereafter. Preferably, the bearing member is of such form and dimensions to permit passage through the aperture defined by the humeral component (which is located in the humerus beforehand) to engage the bearing surfaces and, at the same time, connect the ulnar bearing member with its platform. This preferred arrangement is particularly advantageous in minimizing the separation movement which is required between the ulnar and humerus for the purposes of implantation, and thereby minimizes interference with the natural ligaments of the joint.

While the invention has been described with reference to a specific embodiment, as illustrated, this is, as noted earlier, by way of example and is not intended to be limiting. The invention is discussed more generally in the introduction of this specification and is subject to variation within the scope of such discussion. For example, the present preference is for use of a combination of metal and plastics material, such as chrome-cobalt-molybdenum alloy and high density polyethylene as used in other endoprosthetic bone joint devices, but other materials and combinations thereof are possible.

Also, while it is presently preferred to avoid the use of the more conventional elongate intramedullary stems for purposes of fixation, these can be employed if desired. In this event the stems are suitably of the form described in British Pat. Specification No. 1,305,391 and are shown in broken outline in the accompanying drawings extending generally radially relative to the axes of their respective bearing surfaces. However, other configurations of stem are possible and may allow the provision of symmetrical components which do not require the manufacture of left and right hand versions.

I claim:

1. An endoprosthetic elbow joint device comprising a cooperable pair of ulnar and humeral components; the ulnar component including a first bearing member having a first bearing surface of generally saddle shaped formed as a part of a surface of revolution with concave circumferential form and convex axial form; and the humeral component including a bifurcated member, and a second bearing member bridging the free ends of the arms of said bifurcated member; said second bearing member having a second bearing surface in mutual articulatory generally complementary bearing engagement with said first bearing surface, and shaped as a surface of revolution with its axis of revolution coincident with that of said first bearing surface and extending between said arm free ends, with convex circumferential form of greater angular extent than that of said first bearing surface, and with concave axial form.

2. A device according to claim 1 wherein the circumferential curvature of said first bearing surface is greater than the axial curvature of said second bearing surface.

3. A device according to claim 1 wherein said first bearing member has an overall curved form with an under surface, remote from said first bearing surface, defined by a surface of revolution having an axis parallel to that of said first bearing surface.

4. A device according to claim 3 wherein said ulnar component comprises a platform member releasably connected with said first bearing member remotely from said first bearing surface.

5. A device according to claim 4 wherein said first bearing member and said platform member are slidably connected by complementary dovetail-sectioned key and keyway formations respectively formed therein to extend, in the circumferential direction of said first bearing surface.

6. A device according to claim 5 wherein said platform member has a slot formed in one end thereof to extend parallel to the respective one of said formations, and said first bearing member has a projection from its undersurface engaged with said slot.

7. A device according to claim 4 wherein said platform member has a low relief configuration formed in its surface remote from said first bearing member, and said bifurcated member has a low relief configuration formed on its arm in mutually outwardly facing surface portions thereof.

8. A device according to claim 4 wherein said first bearing member is formed and dimensioned to pass through the aperture defined by said second bearing member.

9. A device according to claim 4 wherein said platform member has an intramedullary stem extending integrally from the other end thereof remote from said slot, and said bifurcated member has an intramedullary stem extending integrally from the junction of said arms, both said stems extending generally radially relative to said axis.

10. A device according to claim 4 wherein said first bearing and platform members are respectively made of plastics material and metal, and said humeral component is of integral metal construction.

* * * * *